US011425020B2

United States Patent
Sommers (10) Patent No.: US 11,425,020 B2
(45) Date of Patent: Aug. 23, 2022

(54) METHODS, SYSTEMS, AND COMPUTER READABLE MEDIA FOR STORAGE, RETRIEVAL, AND USE OF PROGRAMMABLE PIPELINE DEVICE PROFILES

(71) Applicant: Keysight Technologies, Inc., Santa Rosa, CA (US)

(72) Inventor: Christian Paul Sommers, Bangor, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/220,617

(22) Filed: Apr. 1, 2021

(65) Prior Publication Data
US 2021/0377146 A1 Dec. 2, 2021

Related U.S. Application Data

(60) Provisional application No. 63/032,938, filed on Jun. 1, 2020.

(51) Int. Cl.
*H04L 43/50* (2022.01)
*H04L 43/00* (2022.01)
(Continued)

(52) U.S. Cl.
CPC .......... *H04L 43/50* (2013.01); *G06F 9/3851* (2013.01); *H04L 43/14* (2013.01); *H04L 67/1097* (2013.01); *H04L 67/306* (2013.01)

(58) Field of Classification Search
None
See application file for complete search history.

(56) References Cited

U.S. PATENT DOCUMENTS

| 7,272,822 B1 | 9/2007 | Riggins et al. |
| 8,028,276 B1 | 9/2011 | Bessonov |

(Continued)

FOREIGN PATENT DOCUMENTS

| CN | 107749802 A | 3/2018 |
| CN | 110719212 A | 1/2020 |
| DE | 102020114730 A1 | 12/2020 |

OTHER PUBLICATIONS

Keysight Technologies, "Keysight Test Automation Platform (TAP)—Developer Guide", TAP version 7.4, 52 pages (Year: 2017).*

(Continued)

*Primary Examiner* — Davoud A Zand (57) ABSTRACT

A method for storage, retrieval, and use of programmable pipeline device profiles includes creating a plurality of different programmable pipeline device profiles and a catalog for locating and retrieving the profiles, each programmable pipeline device profile including compiled object code for configuring a programmable pipeline device to implement a network test or network visibility function and metadata describing the programmable pipeline device profile. The method further includes storing the catalog and at least a portion of the profiles in a non-transitory computer readable storage medium. The method further includes selecting, using the catalog, one of the profiles stored in the non-transitory computer readable storage medium. The method further includes using the profile to configure the programmable pipeline device for implementing the network test or visibility function.

20 Claims, 7 Drawing Sheets

(51) Int. Cl.
*G06F 9/38* (2018.01)
*H04L 67/1097* (2022.01)
*H04L 67/306* (2022.01)

(56) References Cited

U.S. PATENT DOCUMENTS

| | | | |
|---|---|---|---|
| 8,402,435 B1 | 3/2013 | Spiro | |
| 9,063,815 B2* | 6/2015 | Kundu | G06F 8/63 |
| 9,582,620 B1 | 2/2017 | Segal et al. | |
| 9,747,084 B2 | 8/2017 | Hall | |
| 9,891,898 B1 | 2/2018 | Tonsing | |
| 10,002,247 B2* | 6/2018 | Suarez | G06F 9/45558 |
| 10,164,829 B1 | 12/2018 | Watson et al. | |
| 10,225,381 B1 | 3/2019 | Bosshart | |
| 10,303,796 B2* | 5/2019 | Gangadharappa | G06F 16/27 |
| 10,324,436 B2 | 6/2019 | Oliverio et al. | |
| 10,394,991 B2 | 8/2019 | Phoon et al. | |
| 10,587,491 B1 | 3/2020 | Volpe | |
| 10,733,088 B1 | 8/2020 | Sommers | |
| 10,868,730 B2 | 12/2020 | Mozumdar et al. | |
| 10,880,197 B2 | 12/2020 | Naskar et al. | |
| 11,032,151 B1 | 6/2021 | Sommers | |
| 11,093,376 B2 | 8/2021 | Sommers et al. | |
| 2004/0158602 A1* | 8/2004 | Broberg | H04L 67/1095 709/200 |
| 2006/0168205 A1 | 7/2006 | Barron et al. | |
| 2006/0259629 A1 | 11/2006 | Usmani et al. | |
| 2009/0112505 A1 | 4/2009 | Engel et al. | |
| 2011/0145649 A1 | 6/2011 | Nilsson et al. | |
| 2011/0183613 A1 | 7/2011 | Nocera | |
| 2012/0033678 A1 | 2/2012 | Page et al. | |
| 2013/0152047 A1 | 6/2013 | Moorthi et al. | |
| 2014/0157245 A1 | 6/2014 | Krueger | |
| 2015/0088827 A1 | 3/2015 | Xu et al. | |
| 2015/0172208 A1 | 6/2015 | DeCusatis et al. | |
| 2015/0234725 A1 | 8/2015 | Cillis et al. | |
| 2015/0365325 A1 | 12/2015 | Hwang et al. | |
| 2016/0234087 A1 | 8/2016 | Nyerges et al. | |
| 2017/0093986 A1 | 3/2017 | Kim et al. | |
| 2017/0237632 A1 | 8/2017 | Hegde et al. | |
| 2017/0322873 A1 | 11/2017 | Morris | |
| 2018/0137139 A1* | 5/2018 | Bangalore | H04L 67/2842 |
| 2018/0210823 A1 | 7/2018 | Vorganti | |
| 2018/0255027 A1 | 9/2018 | Winig et al. | |
| 2018/0316608 A1 | 11/2018 | Dowlatkhah et al. | |
| 2019/0014395 A1 | 1/2019 | Anand et al. | |
| 2019/0065349 A1 | 2/2019 | Sharma et al. | |
| 2019/0199654 A1 | 6/2019 | Pope et al. | |
| 2019/0222481 A1 | 7/2019 | Hira | |
| 2019/0379588 A1 | 12/2019 | Rao | |
| 2019/0384580 A1 | 12/2019 | Martini et al. | |
| 2020/0021512 A1 | 1/2020 | Naskar et al. | |
| 2020/0267059 A1 | 8/2020 | Mozumdar et al. | |
| 2020/0401504 A1 | 12/2020 | Sommers et al. | |
| 2021/0389954 A1 | 12/2021 | Sommers | |

OTHER PUBLICATIONS

Applicant-Initiated Interview Summary for U.S. Appl. No. 16/446,318 (dated May 26, 2021).
Notice of Allowance and Fee(s) Due for U.S. Appl. No. 16/446,318 (dated May 26, 2021).
Combined Search and Examination Report under Sections 17 & 18(3) for Great Britain Application Serial No. GB2009118.7 (dated Mar. 8, 2021).
Notice of Allowance and Fee(s) Due for U.S. Appl. No. 16/269,498 (dated Mar. 8, 2021).
Non-Final Office Action for U.S. Appl. No. 16/446,318 (dated Feb. 4, 2021).
Non-Final Office Action for U.S. Appl. No. 16/269,498 (dated Nov. 17, 2020).
Notice of Allowance and Fee(s) Due for U.S. Appl. No. 16/869,129 (dated Sep. 28, 2020).
Notice of Allowance and Fee(s) Due for U.S. Appl. No. 16/035,534 (dated Aug. 27, 2020).
Advisory Action and AFCP 2.0 Decision for U.S. Appl. No. 16/269,498 (dated Jul. 27, 2020).
Final Office Action for U.S. Appl. No. 16/269,498 (dated May 8, 2020).
Commonly-Assigned, co-pending U.S. Appl. No. 16/869,129 for "Methods, Systems, and Computer Readable Media for Testing Network Elements of an In-Band Network Telemetry Capable Network," (Unpublished, filed May 7, 2020).
Notice of Allowance and Fee(s) Due for U.S. Appl. No. 16/290,426 (dated May 7, 2020).
Non-Final Office Action for U.S. Appl. No. 16/035,534 (dated Apr. 13, 2020).
Notice of Allowance and Fee(s) Due for U.S. Appl. No. 16/181,309 (dated Mar. 19, 2020).
Notice of Allowance and Fee(s) Due for U.S. Appl. No. 16/290,426 (dated Mar. 18, 2020).
Non-Final Office Action for U.S. Appl. No. 16/269,498 (dated Jan. 28, 2020).
Sommers, "P4 Data Plane Profile Reconciliation," ip.com, pp. 1-5 (2020).
Sommers, "Multiple Data Plane Profiles Digest and Catalog Definition and Selection," ip.com, pp. 1-5 (2020).
Sommers, "P4 Profile Generation Based on Prospective Device Configuration," ip.com, pp. 1-9 (2020).
Sommers, "Composable/Scalable Data Plane Based on Initial Complier Input Parameters," ip.com, pp. 1-8 (2020).
Johansson et al., "Dynamic Configuration of Packet Deduplication Engine in Tofino," ip.com, pp. 1-6 (2020).
Non-Final Office Action for U.S. Appl. No. 16/181,309 (dated Oct. 28, 2019).
Sommers et al., "Dynamic Test-Based P4 Packet Blaster Hardware Configuration ED—Dari Kuhn," IP.com, pp. 1-5 (2019).
Commonly-Assigned, co-pending U.S. Appl. No. 16/446,318 for "Methods, Systems, and Computer Readable Media for Configuring a Test System Using Source Code of a Device Being Tested," (Unpublished, filed Jun. 19, 2019).
Commonly-Assigned, co-pending U.S. Appl. No. 16/290,426 for "Methods, Systems, and Computer Readable Media for Testing a Network Node or a Related Application Programming Interface Using Source Code Metadata," (Unpublished, filed Mar. 1, 2019).
Zhang et al., "HyperVDP: High-Performance Virtualization of the Programmable Data Plane," IEEE Journal on Selected Areas in Communications, vol. 37, No. 3, pp. 556-569 (Mar. 2019).
Commonly-Assigned, co-pending U.S. Appl. No. 16/269,498 for "Methods, Systems, and Computer Readable Media for Providing Dynamically Configurable, Distributed Network Visibility Device," (Unpublished, filed Feb. 6, 2019).
"Dynamic Test-Based P4 Packet Blaster Hardware Configuration," IPCOM000257013D, pp. 1-6 (Jan. 10, 2019).
"The World's Fastest & Most Programmable Networks," Barefoot Networks, https://barefootnetworks.com/resources/worlds-fastest-most-programmable-networks/, pp. 1-10 (Feb. 6, 2019).
"P4Runtime Specification," The P4.org API Working Group, Version 1.0.0, pp. 1-97 (Jan. 29, 2019).
"P4Runtime Specification," The P4.org API Working Group, Version 1.0.0-rcA, pp. 1-72 (Jan. 25, 2019).
"Cubro Sessionmaster EXA48600," Cubro Network Visibility, pp. 1-5 (2019).
"PAlang / switch," https://github.com/p4lang/switch, pp. 1-4 (Copyright 2019).
"Sparkline," Wikipedia, https://en.wikipedia.org/wiki/Sparkline, pp. 1-3 (2019).
Hill et al., "Tracking Network Flows with P4," University of Amsterdam, System and Network Engineering, pp. 1-16 (2018).
Sommers et al., "Dynamic Test-Based P4 Packet Blaser Hardware Configuration," ip.com, pp. 1-5 (2018).
Commonly-Assigned, co-pending U.S. Appl. No. 16/181,309 for "Methods, Systems, and Computer Readable Media for Testing Network Elements of an In-Band Network Telemetry Capable Network," (Unpublished, filed Nov. 5, 2018).

(56) References Cited

OTHER PUBLICATIONS

Rodriguez et al., "BB-Gen: A Packet Crafter for P4 Target Evaluation", SIGCOMM Posters and Demos '18, pp. 1-3 (Aug. 20-25, 2018).

Commonly-Assigned, co-pending U.S. Appl. No. 16/035,534 for "Methods, Systems, and Computer Readable Media for Testing a Network Node Using Source Code," (Unpublished, filed Jul. 13, 2018).

Saha et al., "Fault Detection Effectiveness of Source Test Case Generation Strategies for Metamorphic Testing," MET, arXiv:1802.07361v1, pp. 1-8 (Feb. 20, 2018).

Nötzli, "p4pktgen: Automated Test Case Generation for P4 Programs," SOSR '18, pp. 1-7 (Mar. 28-29, 2018).

Anand et al., "POINT: An Intent-driven Framework for Integrated Packet-Optical In-band Network Telemetry," Infinera Corporation, pp. 1-6 (2018).

Liang et al., "In-band Network Function Telemetry," Tsinghua University, pp. 1-3 (Aug. 20-25, 2018).

Iša et al., "Verification of Generated RTL from P4 Source Code," 2018 IEEE 26th International Conference on Network Protocols, pp. 1-2 (2018).

"Test Case Management for Improved QA," Perforce, pp. 1-13 (2018).

"Cubro's network packet broker evolution," Cubro Blog, pp. 1-3 (Jan. 15, 2018).

Mckeown et al., "P4 Runtime—Putting the Control Plane in Charge of the Forwarding Plane," The P4 Language Consortium, pp. 1-6 (Dec. 4, 2017).

P4 (programming language), Wikipedia, https://en.wikipedia.org/w/index/php?title=P4_(programming_language)&oldid=812348591, pp. 1-3 (Nov. 27, 2017).

"Keysight Test Automation Platform (TAP)," Keysight Technologies, V7.4, pp. 1-52 (Jun. 15, 2017).

"P416 Language Specification," The P4 Language Consortium, version 1.0.0, pp. 1-129 (May 22, 2017).

Song et al., "Dynamic Network Probes: A Stepping Stone to Omni Network Visibility," arXiv:1612.02862v1, pp. 1-7 (Dec. 8, 2016).

Shahbaz et al., "Pisces: A Programmable, Protocol-Independent Software Switch," SIGCOMM'16, pp. 1-14 (Aug. 22-26, 2016).

Papneja et al., "Basic BGP Convergence Benchmarking Methodology for Data-Plane Convergence," RFC 7747, pp. 1-35 (Apr. 2016).

Ginoza, "Request for Comments Summary RFC Nos. 2800-2899," RFC 2899, pp. 1-22 (May 2001).

Bradner et al., "Benchmarking Methodology for Network Interconnect Devices," RFC 2544, pp. 1-31 (Mar. 1999).

* cited by examiner

METHODS, SYSTEMS, AND COMPUTER READABLE MEDIA FOR STORAGE, RETRIEVAL, AND USE OF PROGRAMMABLE PIPELINE DEVICE PROFILES

RELATED APPLICATIONS

This application claims the priority benefit of U.S. Provisional Patent Application Ser. No. 63/032,938 filed Jun. 1, 2020, the disclosure of which is incorporated herein by reference in its entirety.

TECHNICAL FIELD

The subject matter described herein relates to programmable pipeline devices. More particularly, the subject matter described herein relates to methods, systems, and computer readable media for storage, retrieval, and use of programmable pipeline device profiles.

BACKGROUND

Hardware switching application specific integrated circuits (ASICs), both fixed and programmable, can have multiple build or configuration profiles, each of which determines a range of capabilities and features. Fixed pipeline devices are configurable (e.g. via register programming) to allow different arrangement of resources. For example, a programmable switching ASIC might have numerous ternary content addressable memory (TCAM) tiles which can be arranged into different 2D arrays to effect wider match keys (number of TCAM match bits) or deeper tables (number of table rows). Various on-chip resources are configurable to permit feature and capacity tradeoffs using a fixed pool of resources. These devices usually have fixed-function blocks as well, e.g. L2 or L3 lookup tables. The number of configurable permutations on these devices is large but somewhat constrained by the fixed nature of the pipelines. Each such configuration profile takes a relatively small amount of compute resources in the form of control software, disk files, etc. There is usually no requirement to compile the designs since the architecture is fixed-function. AH configuration is done at run-time.

Programmable pipeline devices (e.g., Barefoot/Intel Tofino, Broadcom Trident4, Mellanox Spectrum II/III) have even finer-grained resource pools and extremely flexible pipeline configurations. A P4 or NPL program is compiled, and the output (object code and other artifacts) is loaded onto the device to configure the on chip resources and thereby execute the user's data plane program. With this approach a nearly infinite range of solutions in the form of build profiles is possible. Each profile may require separate, time-consuming compilation, and the resulting output artifacts take appreciable space in the form of disk files. Using a program template with parameter inputs to generate program variations reduces the labor required to generate program variations over an approach where each program variation is manually created. However, even using a template-based program variation generation approach will result in a number of program variations that can exceed the storage capacity of a device. In addition, locating the program variation that matches a particular use case may be difficult.

The inputs to a programmable pipeline device configuration compiler are 1) source code and 2) a profile definition. The source code describes the programmable pipeline device's behavior and can declare constructs, such as a layer 3 lookup table, and actions to be performed, such as "set the source IP address to (value)." The profile definition includes parameters that specify configuration options for the constructs created in the source code. For example, one profile definition may allocate 2000 entries for an IP version 4 (IPv4) lookup table and 1000 entries for an IP version 6 (IPv6) lookup table, and another profile definition may allocate 1000 entries for the IPv4 lookup table and 2000 entries for the IPv6 lookup table. Each of these profile definitions, when input to the compiler with the corresponding source code, will cause the compiler to output a compiled profile, which includes object code directly executable by a programmable pipeline device to configure the device to implement the desired functionality. The compiler may also output metadata associated with the compiled profile, which describes the function of the profile. Metadata can also be harvested by a separate tool from text embedded in the source code. Metadata can also be manually extracted from the source code. The object code and metadata associated with a compiled profile are also referred to as profile artifacts.

One problem that occurs with programmable pipeline devices is that there are a limitless number of possible profiles for programmable pipeline devices, and the devices themselves and the systems in which they reside have limited storage space for storing compiled profiles. Another problem is that the generation of compiled profiles is time consuming, both from the point of view of the developer and the compiler.

In light of these and other difficulties, there exists a need for methods, systems, and computer readable media for storage, retrieval, and use of programmable pipeline device profiles.

SUMMARY

A method for storage, retrieval, and use of programmable pipeline device profiles includes creating a plurality of programmable device profiles and a catalog for locating and retrieving profiles, each programmable pipeline device profile including compiled object code for configuring a programmable pipeline device to implement a network test or network visibility function and metadata describing the programmable pipeline device profile. The method further includes storing the catalog and at least a portion of the profiles in a non-transitory computer readable storage medium. The method further includes selecting, using the catalog, one of the profiles stored in the non-transitory computer readable storage medium. The method further includes using the profile to configure the programmable pipeline device for implementing the network test or visibility function.

According to another aspect of the subject matter described herein, creating the device profiles and the catalog includes executing a batch process that receives as inputs plural profile definitions and a programmable pipeline device source code program and that produces as outputs plural different profiles, metadata for each profile, and a catalog entry for the profile from the metadata.

According to another aspect of the subject matter described herein, storing at least a portion of the profiles in the non-transitory computer readable storage medium includes storing a first portion of the profiles in a file system of a network test device or a network visibility device in which the programmable pipeline device resides.

According to another aspect of the subject matter described herein, storing at least a portion of the profiles in the non-transitory computer readable storage medium includes storing a second portion of the profiles in a cloud storage device accessible to a network test or visibility device user.

According to another aspect of the subject matter described herein, the first portion is a subset of the programmable pipeline device profiles in the second portion.

According to another aspect of the subject matter described herein, selecting one of the profiles includes selecting one of the profiles in response to a request from a network test or visibility device user.

According to another aspect of the subject matter described herein, selecting one of the profiles includes extracting network test or visibility device use case parameters from the request, matching the use case parameters with metadata associated with a plurality of the profiles, and selecting the one profile from the plurality of profiles having metadata that matches the use case parameters.

According to another aspect of the subject matter described herein, selecting the one profile from the plurality of profiles having metadata that matches the use case parameters includes selecting the one profile automatically based on a profile selection policy.

According to another aspect of the subject matter described herein, selecting the one profile from the plurality of profiles having metadata that matches the use case parameters includes ranking the profiles having metadata that matches the use case parameters based on a profile selection policy, presenting the profiles having metadata that matches the use case parameters and associated rankings to a user, and receiving a selection from the user of one of the profiles having metadata that matches the use case parameters.

According to another aspect of the subject matter described herein, wherein the programmable pipeline device comprises a programmable P4 device.

According to another aspect of the subject matter described herein, a system for storage, retrieval, and use of programmable pipeline device profiles is provided. The system includes at least one processor. The system further includes a non-transitory computer readable medium that stores a catalog describing programmable pipeline device profiles and at least a portion of the programmable device profiles, each programmable pipeline device profile including compiled object code for configuring a programmable pipeline device to implement a network test or network visibility function and metadata describing the programmable pipeline device profile. The system further includes network test or network visibility configuration software implemented by the at least one processor for selecting, using the catalog, one of the profiles stored in the non-transitory computer readable storage medium and using the profile to configure the programmable pipeline device for implementing the network testing or visibility function.

According to another aspect of the subject matter described herein, the system for storage, retrieval, and use of programmable pipeline device profiles includes a profile and catalog generator implemented as a batch process that receives as inputs plural profile definitions and a programmable pipeline device source code program and that produces as outputs plural different profiles, metadata describing each profile, and a catalog entry for each entry from the metadata.

According to another aspect of the subject matter described herein, the network test or visibility device configuration software is configured to select one of the profiles in response to a request from a network test or visibility device user.

According to another aspect of the subject matter described herein, the network test or visibility device configuration software is configured to extract network test or visibility device use case parameters from the request, match the use case parameters with metadata associated with a plurality of the profiles, and select the one profile from the plurality of profiles having metadata that matches the use case parameters.

According to another aspect of the subject matter described herein, the network test or visibility device configuration software is configured to select the one profile based on a profile selection policy.

According to another aspect of the subject matter described herein, the programmable pipeline device comprises a programmable P4 device.

According to another aspect of the subject matter described herein, a non-transitory computer readable medium having stored thereon executable instructions that when executed by a processor of a computer control the computer to perform steps is provided. The steps include creating a plurality of different programmable pipeline device profiles and a catalog for locating and retrieving the programmable pipeline device profiles, each programmable pipeline device profile including compiled object code for configuring a programmable pipeline device to implement a network test or network visibility function and metadata describing the programmable pipeline device profile. The steps further include storing the catalog and at least a portion of the programmable device profiles in a non-transitory computer readable storage medium. The steps further include selecting, using the catalog, one of the profiles stored in the non-transitory computer readable storage medium. The steps further include using the profile to configure the programmable pipeline device for implementing the network test or visibility function.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for storage, retrieval, and use of programmable pipeline device profiles. The subject matter described herein addresses at least the following problems associated with creation, storage and retrieval of programmable pipeline device profiles:

1. How can we store a catalog describing these profiles such that they may be presented to an end-user or even automated orchestration software, to allow selection of the correct profile?
2. How can we match a viable data plane profile (whether configurable or programmable) to an actual use-case? For example, a user may have a prospective configuration for a network packet broker (NPB) which will require a certain number of IPv4 match entries in a layer 3 (L3) TCAM table, a certain number of media access control (MAC) address entries in a layer 2 (L2) TCAM table, and so forth, for any number of so-called "qualifiers" which are typically protocol header fields. The problem addressed is, given such constraints, how to select the correct or best matching profile from available profiles.
3. How can the profile artifacts (object code, etc.) be stored and retrieved for loading/executing on a device? For example, if 1000 profile permutations exist, they may exceed the storage built-in disk capabilities of an NPB appliance.
4. How can numerous profiles be generated? This includes specifying the parameters of the profile and the compiled artifacts. Compiling a profile may take minutes to tens of minutes. A prospective profile may not "fit" the device and it takes the compiler a long time to figure this out before it "fails."
5. How can device configurations created for one profile be reconciled against a different profile in case it is now being executed? A user may create a configuration and deploy it using a given profile. If the user needs to change the profile to accommodate a different use-case, does the existing configuration still work on the new profile? How do you determine that? What do you do about it if it doesn't fit?
6. How does a user get a new profile on demand which isn't already offered (to satisfy some use-cases which don't fit available profiles)?

Figure 1:
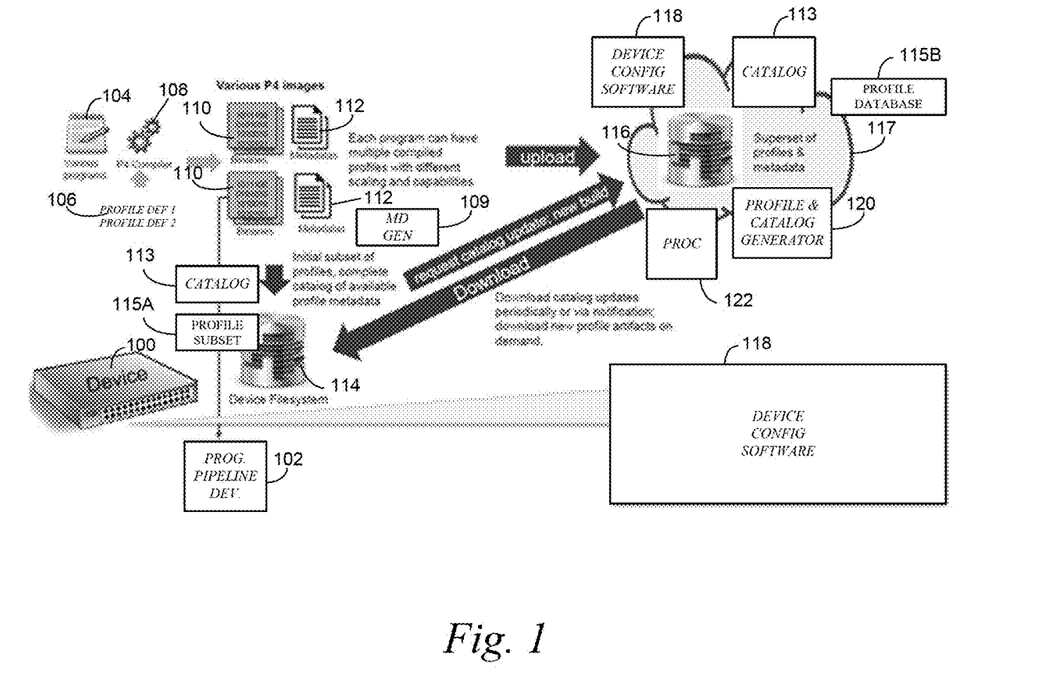
FIG. 1 is a block diagram illustrating an exemplary system for compiling, storing, retrieving, and using programmable pipeline device profiles.

In order to address these problems, the subject matter described herein includes the creation and storage of a catalog of programmable pipeline device profiles that can be presented to the end user or to automated orchestration software to allow manual, automatic, or assisted selection of a profile. FIG. 1 is a block diagram of a system for compiling, storing, retrieving, and using programmable pipeline device profiles. In the example in FIG. 1, the profiles are P4 profiles. However, the subject matter described herein is not limited to the P4 programming language. Any programming language usable to configure a programmable pipeline device is intended to be within the scope of the subject matter described herein.

Referring to FIG. 1, a device 100 may be any suitable device that includes a programmable pipeline device 102. And one example, device 100, may be a network visibility device, such as a network packet broker. In the illustrated example, programmable pipeline device 102 comprises the Tofino™ chip available from Barefoot Networks (now owned by Intel Corporation). However, any programmable pipeline device is intended to be within the scope of the subject matter described herein.

To configure the programmable pipeline device 102, a user writes programs 104 in a source code programming language, such as the P4 programming language. The user or developer also creates profile definitions 106 that specify the configuration parameters for a particular profile. Source code 104 and profile definitions 106 are input to a compiler 108. Compiler 108 outputs programmable device profiles 110 that include object code directly executable by programmable pipeline device 102 to configure programmable pipeline device 102 to implement desired functions. Compiler 108 may also outputs metadata 112 that describes the profile. Alternatively, a metadata generator 109 may generate metadata 112 from text, such as comments included in source code 104.

In order to make plural profiles accessible to users and orchestration software, the subject matter described herein includes creation of a catalog 113 of profile metadata and storing catalog 113 in a non-transitory computer readable storage medium. In one example, the catalog may represent the entirety of available device profiles (whether stored locally on device 100 or in a separate location, such as a cloud storage device. In the example illustrated in FIG. 1, catalog 113 is stored in a device file system 114 along with profile subset 115A containing object code for profiles for expected use cases of device 100. Device file system 114 may be stored in the storage space of device 100 on which programmable pipeline device 102 resides. Catalog 113 may also be stored in or on a cloud storage device 116. Cloud storage device 116 may also store profile database 115B containing a superset of programmable pipeline device profiles, including compiled object code for each profile. When new profiles are created, catalog 113 and profile database 115B stored in cloud storage device 116 are updated, and catalog and/or profile updates may be downloaded to device 100 periodically or upon request. For example, device 100 or an orchestration interface associated with device 100 may request catalog and/or profile updates from cloud storage device 116. Device 100 may also include or be associated with network test or visibility device configuration software 118 that allows a network test or visibility device user to create configurations, search, match, and select profiles, reconcile configurations between profiles, browse an online catalog of profiles for matches with use cases, download the profiles, and also compile profiles on demand. Device configuration software 118 may reside on device 100 in network cloud 117, or on a computing device separate from device 100 and cloud 117. In one particular example, device configuration software 118 may be implemented on a cloud resident device that a user can access via a web browser or other suitable client interface to search, select, and load profiles onto device 100.

To address the above-described first problem of how profiles can be presented to allow selection of the correct or most suitable profile for a use case, each profile will have numerous parameters describing its features, scaling factors, power draw under various conditions (if determinable), license fee, if applicable, etc. For example, profile X supports matching against 8,192 IPv4 entries, 4,096 IPv6 entries, both inner tunnel and outer tunnel addresses, 512 VLAN ranges, 1,024 layer 4 port entries, load balancing on inner and outer 5 tuples, etc. Such parameters may be stored for each profile in catalog 113 to allow rapid matching against use cases. In another example, as described above, the user may be presented with a graphical user interface, which, in one example, may be a shopping type interface for the user to select profiles directly.

To address the above-described second problem where the profile is automatically matched with a use case, device configuration software 118 may analyze a prospective use case determine the minimum capabilities that it requires along with parameters associated with device 100 on which the profile will reside. For example, a user may have a prospective configuration for a network packet broker which will require a certain number of IP version 4 match entries in a layer 3 TCAM table, a certain number of MAC address entries in a layer 2 TCAM table, etc., or any number of so-called qualifiers, which are typically protocol header fields. Device configuration software 118 may analyze such parameters using an algorithm (linear searching, machine learning, etc.) and locate all profiles which meet minimum requirements of the use case and rank the profiles according to various metrics. Examples of such metrics may include how much headroom or waste the profile provides for each parameter, power draw, licensing fee, etc. The users or orchestration program can select the best profile according to the user's or orchestration program's policies (e.g., allocate headroom to allow more IPv4 entries in the future; minimum power; cheapest license). Device configuration software 118 may also rank profiles that almost match a given use case and give the user the ability to choose something that is less capable in one or more parameters, but with other benefits (availability cost, power, headroom in another parameter, etc.).

To address the above-described third problem of how profile artifacts can be retrieved for loading and executing on device 100, if the number of permutations cause the superset of profiles to exceed the storage capabilities of device 100, a subset of profiles represented by catalog 113 along with a copy of catalog 113 may be stored on device file system 114 The subset of profiles may be chosen to address typical use cases. If storage space allows, more profiles can be downloaded onto the device from cloud storage 116. If space on device 100 is limited, some profiles can be deleted from device 100 to make room for newer profiles. Any profiles stored on device 100 are available for immediate deployment/execution.

To address the above described fourth problem for generating plural profile configurations that are compatible with a device, programmable pipeline device source code programs 104 may be written in a parameterized way (e.g., using #defines and #ifdefs) to allow for variable scale factors and conditional inclusions of modules or code blocks. This makes the program composable/selectable based on initial compiler input parameters. Thus, by tabulating or generating parameters, a different effective program is realized. The parameters may be all or part of the catalog metadata used to describe a profile's capabilities and scaling factors.

A compiler can be fed the same program with an exhaustive list of profile definitions (sets of parameters) and run to completion or failure (e.g., if it doesn't fit on the device). The list of parameters could be run to exercise various dimensions to determine their maximum viable ranges in combinations with all other parameters. Some tuning might be required to avoid searches that do not result in profiles that are viable for device 100. In one example, profile generation may be automated by a profile and catalog generator 120 that is implemented as a batch process that could be run on a cloud-based server farm or on one machine based on goals and objectives. Profile and catalog generator 120 may generate profiles for catalog 113 where the profiles are viable profiles that will execute on device 100. Profile catalog and generator 120 may also store the profile definitions and source code used to generate each profile. Profile and catalog generator 120 may also generate and store the metadata associated with each profile and create a catalog entry for each profile from the metadata. At least one processor 122 may be associated with profile and catalog generator 120 and device configuration software 118 to execute the functions performed by configuration software 118 and profile and catalog generator 120.

The following code example is P4 source code for generating two different profiles that vary according to MAC and IPv4 table size:

```
BEGINNING OF P4 SOURCE CODE EXAMPLE
//=================================================
PROFILE1 =========================================
    #if (PROFILE == 1)
        #define PROFILE_DESCR "More MAC table entries, fewer IPv4
table entries"
        #define MAC_TABLE_SIZE 4096
        #define IPV4_TABLE_SIZE 1024
    //=================================================
PROFILE2 =========================================
    #elif (PROFILE == 2)
        #define PROFILE_DESCR "Fewer MAC table entries, more IPv4
table entries"
        #define MAC_TABLE_SIZE 1024
        #define IPV4_TABLE_SIZE 4096
    #else
        #error (No recognized profile defined!)
    #endif
        action forward(PortId_t port) {
            ig_intr_tm_md.ucast_egress_port = port;
        }
```

```
    action drop( ) {
        ig_intr_dprsr_md.drop_ctl = 0x1; // Drop packet.
    }
    table ipv4_tbl {
        key = {
            hdr.ipv4.dst_addr : ternary;
            hdr.ipv4.src_addr : ternary;
        }
        actions = {
            drop;
            forward;
            @defaultonly NoAction;
        }
        size = IPV4_TABLE_SIZE; // size from profile
    }
    table mac_tbl {
        key = {
            hdr.ethernet.dst_addr : ternary;
            hdr.ethernet.src_addr : ternary;
        }
        actions = {
            drop;
            forward;
            @defaultonly NoAction;
        }
        size = MAC_TABLE_SIZE; // size from profile
    }
    apply {
        ipv4_tbl.apply( );
        mac_tbl.apply( );
    }
}
Pipeline(SwitchIngressParser( ),
        SwitchIngress( ),
        SwitchIngressDeparser( ),
        EmptyEgressParser( ),
        EmptyEgress( ),
        EmptyEgressDeparser( )) pipe;
// The following annotations will add "profile" metadata to the generated
p4info:
    @pkginfo(name="Example acl program with profiles")
    @Profile_number(PROFILE)
    @Profile_description(PR0FILE_DESCR)
    @Profile_param(mac_table_size=MAC_TABLE_SIZE)
    @Profile_param(ipv4_table_size=IPV4_TABLE_SIZE)
    Switch(pipe) main;
    END OF P4 SOURCE CODE EXAMPLE
```

The P4 source code above is input into the compiler with configuration parameters. The output of the compiler is object code and a P4info file for each profile. The resulting annotations extracted from the p4info files are shown below You can see how the profile parameters are stated above the tables, e.g.

```
#if (PROFILE == 1)
    #define PR0FILE_DESCR "More MAC table entries, fewer IPv4 table
entries"
    #define MAC_TABLE_SIZE 4096
    #define IPV4_TABLE_SIZE 1024
```

The size parameters are then used in the tables themselves:
size=IPV4_TABLE_SIZE; // size from profile
The information specific to each profile is injected into the program's p4info file using annotations as follows:

```
    @pkginfo(name="Example acl program with profiles")
    @Profile_number(PROFILE)
    @Profile_description(PR0FILE_DESCR)
    @Profile_param(mac_table_size=MAC_TABLE_SIZE)
```

```
    @Profile_param(ipv4_table_size=IPV4_TABLE_SIZE)
    @pkginfo(name="Example acl program with profiles")
    @Profile_number(PROFILE)
```

```
    @Profile_description(PR0FILE_DESCR)
    @Profile_param(mac_table_size=MAC_TABLE_SIZE)
    @Profile_param(ipv4_table_size=IPV4_TABLE_SIZE)
```

The resulting p4info file is produced as one artifact of the compiler. Here you see annotations. These can be parsed by a catalog access system, such as the configuration software illustrated in FIG. 1.

The annotation portion of the P4info file for Profiles #1 and #2 is as follows:

```
Example Annotations for Profile #1:
pkg_info {
    name: "Example acl program with profiles"
    annotations: "@Profile_number(1)"
    annotations: "@Profile_description(\"More MAC table entries, fewer IPv4 table entries\")"
    annotations: "@Profile_param(mac_table_size = 4096)"
    annotations: "@Profile_param(ipv4_table_size = 1024)"
Example annotations for Profile #2:
pkg_info {
    name: "Example acl program with profiles"
    annotations: "@Profile_number(2)"
    annotations: "@Profile_description(\"Fewer MAC table entries, more IPv4 table entries\")"
    annotations: "@Profile_param(mac_table_size = 1024)"
    annotations: "@Profile_param(ipv4_table_size = 4096)"
}
```

In the annotation sections above, the annotation parameters contain metadata that describes the functionality of each profile. For example, the following annotations describe the functionality of profile #1:

```
    annotations: "@Profile_number(1)"
        annotations: "@Profile_description(\"More MAC table entries, fewer IPv4 table entries\")"
        annotations: "@Profile_param(mac_table_size = 4096)"
        annotations: "@Profile_param(ipv4_table_size = 1024)"
```

It is the content of these annotation statements that may be extracted and stored in catalog 113 as metadata usable to match profiles with use cases. For example, if the user specifies MAC table size 4096 and IPv4 table size 1024, then the metadata for the profile #1 would match this use case.

To address the above-described fifth problem of determining whether a prospective new profile will be compatible with the existing use-case configuration, device configuration software 118 may analyze the existing configuration of device 100 to determine its "dimensions" (just like when a use case is analyzed to determine which profiles might work). This is then compared against the to-be-installed profile to see if the profile fits in terms of scale (e.g. number of filter rules) and features/capabilities (e.g. match criteria). If the existing configuration does not fit within the prospective profile, then the user can be presented with a report showing the violations. It may be possible to suggest how the configuration can be "pruned" to fit the prospective profile. The user could elect to perform the pruning, and device configuration software 118 will show the effect of the pruning (before executing the pruning).

Another possibility is for device configuration software 118 to suggest a different profile which is close to the one the user was going to use, but still fits the existing configuration. For example, suppose the user chose a profile which increases the number of IPv6 rules from 1024 to 2048. The profile correspondingly reduces the number of IPv4 rules from 4096 to 2048 (due to fixed flexible resources, e.g. TCAM tiles). If the current number of IPv4 rules is 3000, such a configuration will not work with the new profile. However, there might be an alternative profile which supports 1536 IPv6 rules and 3192 IPv4 rules. Device configuration software 118 may suggest the alternative profile as a compromise and it might satisfy the new use-cases (since the user knows they don't really need 2048 IPv6 rules, just 1200).

In order to solve the above-described sixth problem of allowing a user to create a new profile, the user can submit a prospective device configuration or a prospective profile definition (set of parameters) to device configuration software 118, and device configuration software 118 may attempt to build the profile. For example, there might be a combination of scaling factors and capabilities which the user wants but was never generated for some reason (didn't seem useful, overlooked, or there was no prior market demand). The user may submit the combination of scaling factors and capabilities for the profile to device configuration software 118. Device configuration software 118 may analyze the scaling factors and capabilities, extract use case parameters, and use the use case parameters to build or select a compatible profile. Device configuration software 118 may then present the profile to the user for downloading onto device 100.

Figure 2A:
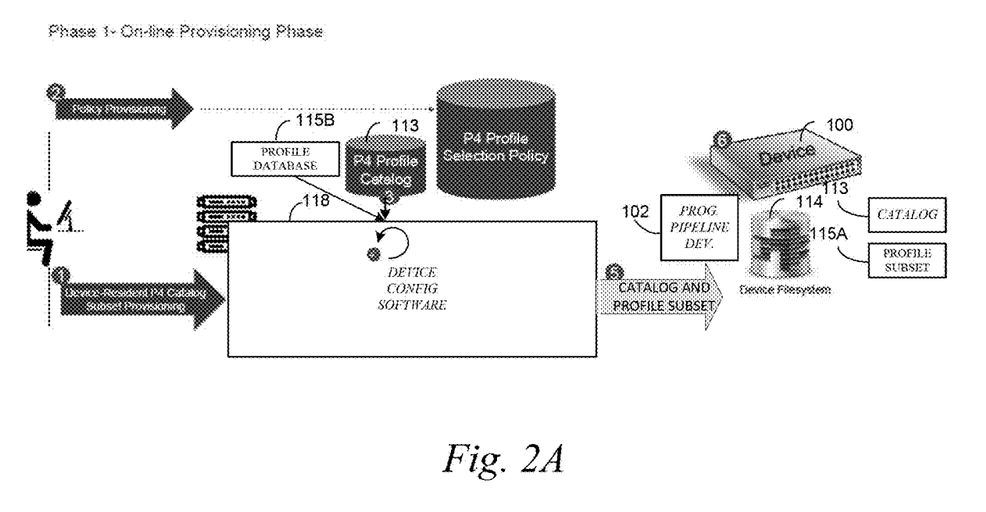
FIG. 2A is a block diagram illustrating an on-line provisioning phase of a programmable pipeline device.

FIG. 2A illustrates an online provisioning phase where device configuration software 118 receives input from a user and provisions a subset of profiles on device 100. Referring to FIG. 2A, in step 1, a user instructs device configuration software 118 to download a subset of profiles from profile database 115B to profile subset 115A and a copy of catalog 113 for provisioning on device 100. In step 2, the user defines profile selection policies that may be used by device configuration software to select a particular profile that will be loaded on to device 100 for execution. In steps 3-5, the subset of profiles from profile database 115B and a copy of catalog 113 are downloaded and loaded onto device 100 via device configuration software 118. After downloading, device file system 114 includes profile subset 115A and a copy of catalog 113.

Figure 2B:
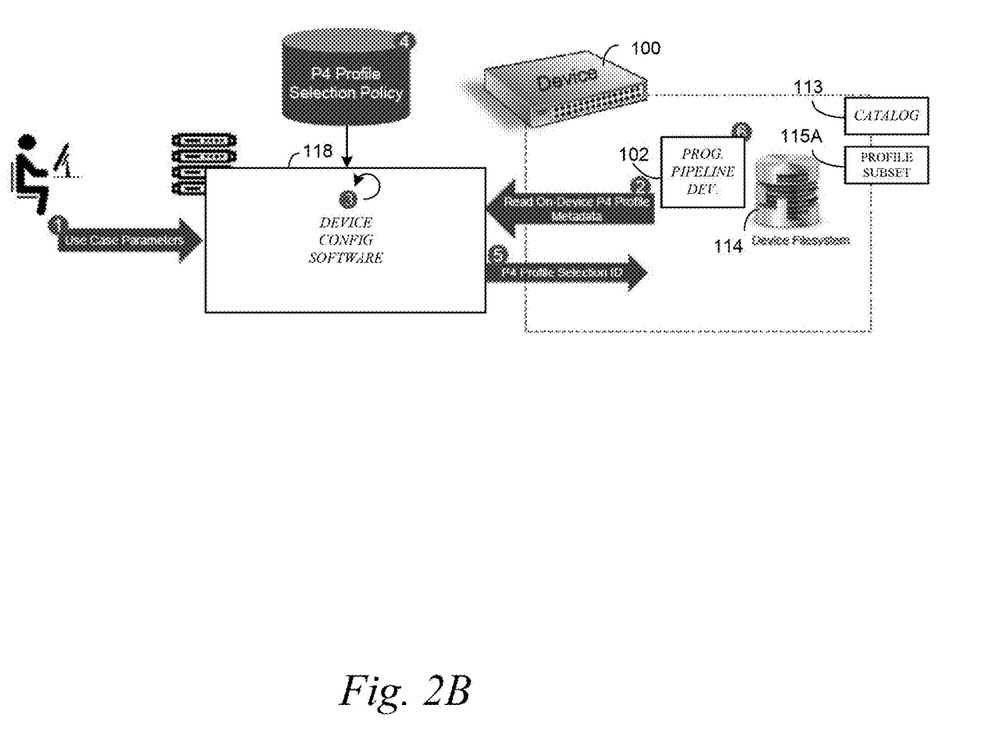
FIG. 2B is a block diagram illustrating an off-line device configuration phase of a programmable pipeline device.

FIG. 2B illustrates the automatic selection of a profile based on use case parameters input by the user. Referring to FIG. 2B, in step 1, a user inputs use case parameters to device configuration software 118. In step 2, device configuration software 118 reads metadata associated with the profile stored on device 100. In step 3, profile selection logic of device configuration software 118 selects, from the profiles resident on device 100, profiles that match the use case input by the user. In step 4, from the profiles that match the use case, the profile selection logic uses the profile selection policies input in the provisioning process of FIG. 2A to determine which of the profiles best matches the user's requirements. For example, the profile selection policies may include policies that rank profiles based on minimizing head room or waste, minimizing license fees, or other suitable criteria. In step 5, profile selection logic of device configuration software 118 selects the profile that best matches the policy and communicates an identifier for the selected profile to device 100. In step 6, device 100 loads the profile onto programmable pipeline device 102 to configure programmable pipeline device 102.

Figure 2C:
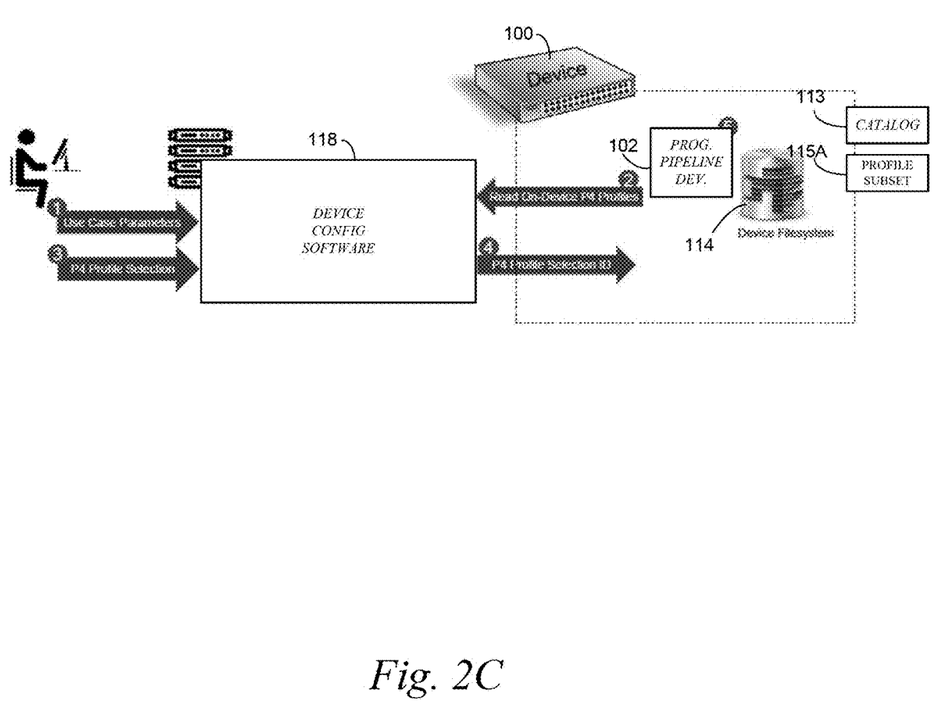
FIG. 2C is a block diagram illustrating a manual off-line device configuration phase of a programmable pipeline device.

FIG. 2C illustrates the case where a user manually selects from available on-device profiles. Referring to FIG. 2C, in step 1, the user inputs use case parameters to device configuration software 118. In step 2, device configuration software 118 reads on-device profiles 115A or more particularly the metadata associated with the on-device profiles 115A and presents profiles that match the use case to the user. In step 3, the user selects one of the matching profiles. In step 4, device configuration software 118 communicates an identifier of the selected profile to device 100. In step 5, device 100 loads the profile onto programmable pipeline device 102 to configure device 102.

Figure 3A:
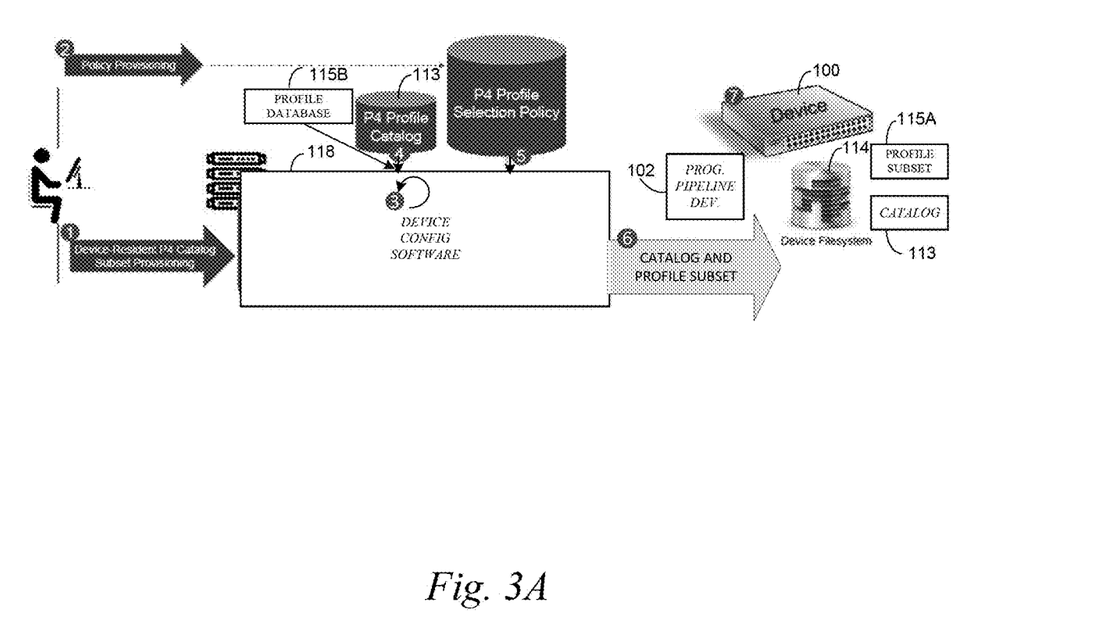
FIG. 3A is a block diagram of an on-line configuration phase of a programmable pipeline device where a subset of a profile catalog and profile selection policies are provisioned on the programmable pipeline device.

FIG. 3A illustrates another example where a subset of a profile catalog is downloaded to device 100 along with the profile selection policy. Referring to FIG. 3A, in step 1, the user initiates provisioning of a copy of catalog 113 and a subset 115A of profiles from profile database 115B onto device 100. In step 2, the user provisions profile selection policies to an online policy registry. In steps 3-6, the subset of the profiles, a copy of catalog 113, and a corresponding policy are communicated to and stored on device 100. After these items are downloaded to device 100, device file system 114 includes profile subset 115A, a copy of catalog 113, and the profile selection policies.

Figure 3B:
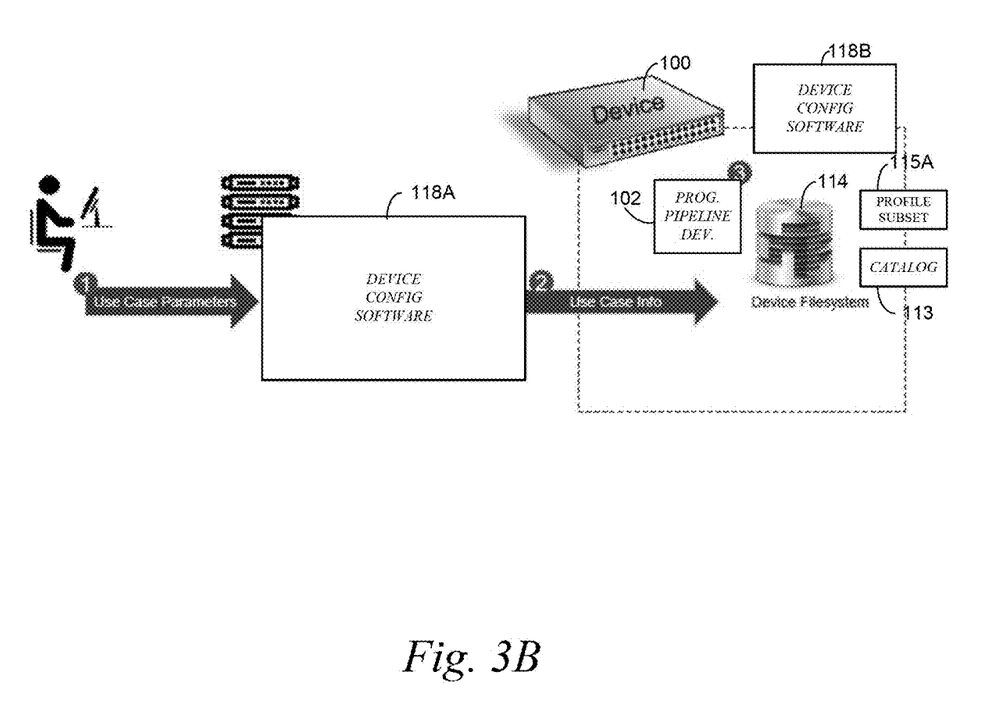
FIG. 3B is a block diagram of an off-line device configuration phase where logic on a target device performs profile selection.

FIG. 3B illustrates the device configuration phase where the policies and profiles are preloaded on device 100 and a portion of programmable device configuration software resides on device 100. In FIG. 3B, device configuration software 118 includes a first portion 118A that resides in a network cloud and a second portion 118B that resides on device 100. First portion 118A communicates with the user and communicates use case parameters to second portion 118B, which locates profiles that match the use case parameters, applies the profile selection policies, and selects one of the matching profiles based on profile selection policies. Referring to FIG. 3B, in step 1, the user inputs use case parameters to first portion 118A of the device configuration software. In step 2, first portion 118A of the device configuration software communicates the use case parameters to second portion 118B of the device configuration software, which resides on device 100. In step 3, second portion 118B of the device configuration software selects profiles that match the use case and applies the profile selection policy to select from among the matching profiles the profile that best matches the policy. Second portion 118B of the device configuration software loads the profile onto programmable pipeline device 102.

Figure 4:
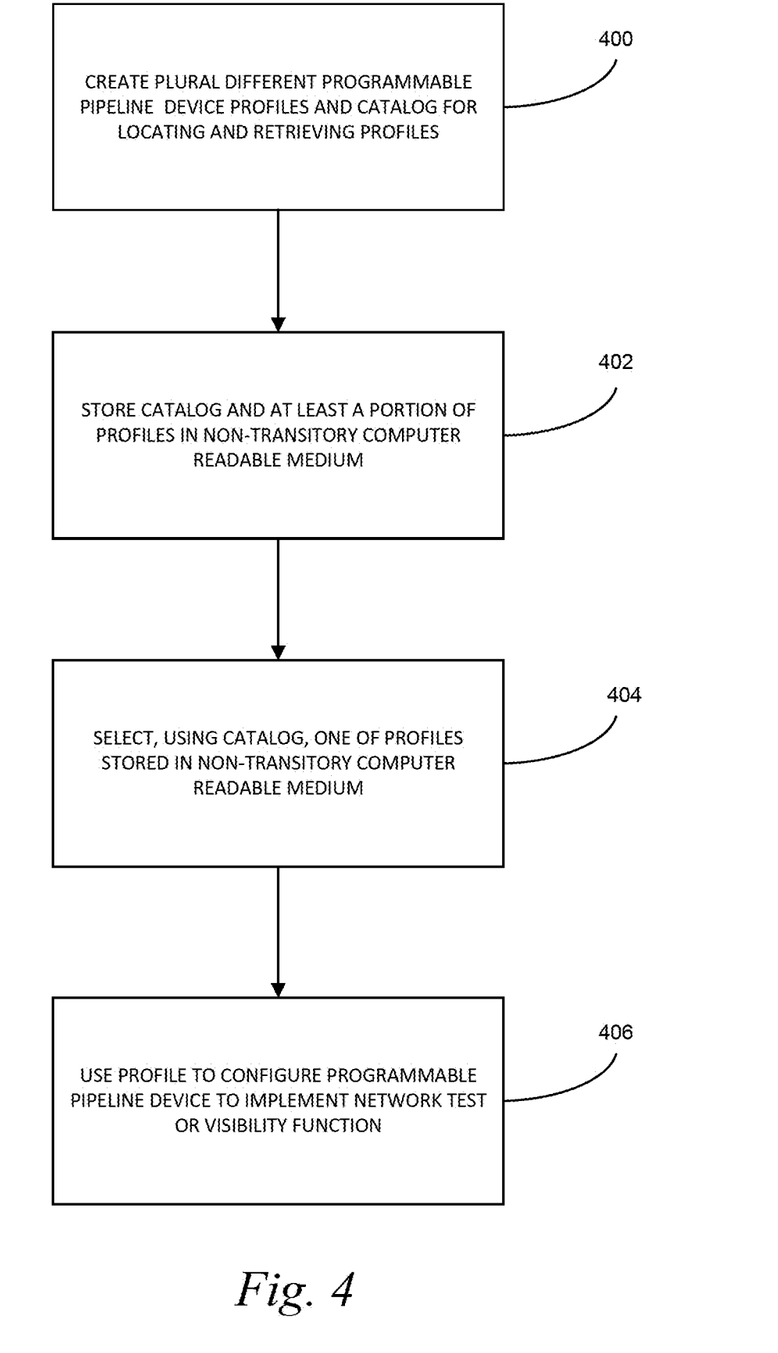
FIG. 4 is a flow chart illustrating an exemplary process for storage, retrieval, and use of programmable pipeline device profiles.

FIG. 4 is a flow chart illustrating an exemplary process for storage, retrieval, and use of programmable pipeline device profiles. Referring to FIG. 4, in step 400, a plurality of different programmable pipeline device profiles to implement network test or visibility functions and a catalog for locating and retrieving the profiles are created. For example, as described above, the profiles may be created manually by users or using a profile and catalog generator that automatically generates profiles given source code and profile definitions as input. The profiles may include object code for executing on the programmable pipeline device as well as metadata that describes the function of the object code associated with each of the profiles. The profile and catalog generator may generate a catalog entry for each profile from the metadata associated with each profile.

In step 402, the catalog and at least a portion of the profiles are stored in a non-transitory computer readable storage medium. For example, catalog 113 and profiles representing typical device use cases may be stored in the file system of device 100.

In step 404, one of the profiles is selected, using the catalog, from the non-transitory computer readable storage medium. For example, a profile may be selected automatically based on use case parameters input by the user. In another example the profile may be selected manually by the user. In yet another example, the profile may be selected from a set of matching profiles based on profile selection policies.

In step 406, the profile is used to configure the programmable pipeline device to implement a network test or visibility device function. For example, once a profile is selected, it may be loaded onto the programmable pipeline device to configure the programmable pipeline device. Examples of network test or visibility device functions may include implementing layer 2 or layer 3 lookup tables to match entries with parameters in received packets. If device 100 is a network packet broker, the layer 2 or layer 3 lookup tables may be associated with a packet filter that filters incoming packets and delivers the filtered packets to a network tool. Other examples of network visibility features that may be implemented using a profile include, but are not limited to, packet deduplication, load balancing, packet header stripping, general routing encapsulation (GRE) tunneling, data masking, deep packet inspection, application identification, packet capture, packet timestamping, passive secure sockets layer (SSL) decryption, active SSL gateway services, network security services, network threat detection services, network threat mitigation services, network flow record creation, network flow statistics generation/reporting, general packet radio service (GPRS) tunneling protocol (GTP) and session initiation protocol (SIP) correlation, GTP and SIP load balancing, mobile subscriber filtering, mobile subscriber sampling, mobile subscriber whitelisting, and packet core filtering.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for storage, retrieval, and use of programmable pipeline device profiles, the method comprising:
creating a plurality of different programmable pipeline device profiles to implement network test or visibility functions and a catalog for locating and retrieving the programmable pipeline device profiles, each programmable pipeline device profile including compiled object code for configuring a programmable pipeline device to implement a network test or network visibility function and metadata describing the programmable pipeline device profile;

storing at least a portion of the profiles and the catalog in a non-transitory computer readable storage medium;

selecting, using the catalog, one of the profiles stored in the non-transitory computer readable storage medium; and using the profile to configure the programmable pipeline device for implementing the network test or network visibility function.

2. The method of claim 1 wherein creating the programmable device profiles and the catalog includes executing a batch process that receives as inputs plural profile definitions and a programmable pipeline device source code program and that produces as outputs plural different profiles, metadata for each profile, and a catalog entry from the metadata.

3. The method of claim 1 wherein storing at least a portion of the profiles the non-transitory computer readable storage medium includes storing a first portion of the profiles in a file system of a network test device or a network visibility device in which the programmable pipeline device resides.

4. The method of claim 3 wherein storing at least a portion of the profiles in the non-transitory computer readable storage medium includes storing a second portion of the profiles in a cloud storage device accessible to a network test or visibility device user.

5. The method of claim 4 wherein the first portion is a subset of the programmable pipeline device profiles in the second portion.

6. The method of claim 1 wherein selecting one of the profiles includes selecting one of the profiles in response to a request from a network test or visibility device user.

7. The method of claim 6 wherein selecting one of the profiles includes extracting network test or visibility device use case parameters from the request, matching the use case parameters with metadata associated with a plurality of the profiles, and selecting the one profile from the plurality of profiles having metadata that matches the use case parameters.

8. The method of claim 7 wherein selecting the one profile from the plurality of profiles having metadata that matches the use case parameters includes selecting the one profile automatically based on a profile selection policy.

9. The method of claim 7 wherein selecting the one profile from the plurality of profiles having metadata that matches the use case parameters includes ranking the profiles having metadata that matches the use case parameters based on a profile selection policy, presenting the profiles having metadata that matches the use case parameters and associated rankings to a user, and receiving a selection from the user of one of the profiles having metadata that matches the use case parameters.

10. The method of claim 1 wherein the programmable pipeline device comprises a programmable P4 device.

11. A system for storage, retrieval, and use of programmable pipeline device profiles, the system comprising:

at least one processor;

a non-transitory computer readable medium that stores a catalog describing programmable pipeline device profiles and at least a portion of the programmable device profiles, each programmable pipeline device profile including compiled object code for configuring a programmable pipeline device to implement a network test or network visibility function and metadata describing the programmable pipeline device profile; and network test or network visibility configuration software implemented by the at least one processor for selecting, using the catalog, one of the profiles stored in the non-transitory computer readable storage medium and using the profile to configure the programmable pipeline device for implementing the network testing or visibility function.

12. The system of claim 11 comprising a profile and catalog generator implemented as a batch process that receives as inputs plural profile definitions and to a programmable pipeline device source code program and that produces as outputs plural different profiles and metadata describing each profile, and a catalog entry for each profile from the metadata.

13. The system of claim 11 wherein the non-transitory computer readable medium includes a file system of the network test or visibility device and wherein a first portion of the profiles is stored in the file system of the network test or visibility device.

14. The system of claim 13 wherein a second portion of the profiles is stored in a cloud storage device accessible to the network visibility or network test configuration software.

15. The system of claim 14 wherein the first portion is a subset of the programmable pipeline device profiles in the second portion.

16. The system of claim 11 wherein the network test or visibility device configuration software is configured to select one of the profiles in response to a request from network test or visibility device user.

17. The system of claim 16 wherein the network test or visibility device configuration software is configured to extract network test or visibility device use case parameters from the request, match the use case parameters with metadata associated with a plurality of the profiles, and select the one profile from the plurality of profiles having metadata that matches the use case parameters.

18. The system of claim 17 wherein the network test or visibility device configuration software is configured to select the one profile based on a profile selection policy.

19. The system of claim 11 wherein the programmable pipeline device comprises a programmable P4 device.

20. A non-transitory computer readable medium having stored thereon executable instructions that when executed by a processor of a computer control the computer to perform steps comprising:

creating a plurality of different programmable pipeline device profiles and a catalog for locating and retrieving the profiles, each programmable pipeline device profile including compiled object code for configuring a programmable pipeline device to implement a network test or network visibility function and metadata describing the programmable pipeline device profile;

storing the catalog and at least a portion of the profiles in a non-transitory computer readable storage medium;

selecting, using the catalog, one of the profiles stored in the non-transitory computer readable storage medium; and using the profile to configure the programmable pipeline device for implementing the network test or visibility function.

\* \* \* \* \*